(12) United States Patent
Plante

(10) Patent No.: US 6,263,684 B1
(45) Date of Patent: Jul. 24, 2001

(54) REFRIGERANT FLOW METER

(76) Inventor: George W. Plante, 3549 Winter Scene Ct., Las Vegas, NV (US) 89147

( * ) Notice: Subject to any disclaimer, the term of this patent is extended or adjusted under 35 U.S.C. 154(b) by 0 days.

(21) Appl. No.: 09/510,163

(22) Filed: Feb. 22, 2000

(51) Int. Cl.$^7$ .................................................. F25B 45/00
(52) U.S. Cl. ............................ 62/129; 62/149; 73/861.77
(58) Field of Search .............................. 62/125, 126, 127, 62/129, 149, 77; 73/861.01, 861.02, 861.03, 861.77, 861.79; 340/610

(56) References Cited

U.S. PATENT DOCUMENTS

| | | | |
|---|---|---|---|
| 3,873,289 | 3/1975 | White | 62/149 |
| 4,114,448 | 9/1978 | Merritt | 73/362 |
| 4,513,578 | 4/1985 | Proctor et al. | 62/149 |
| 4,858,474 | * 8/1989 | Glasheen et al. | 73/861.77 X |
| 4,887,469 | * 12/1989 | Shoptaw | 73/861.77 |
| 4,936,151 | * 6/1990 | Tokio | 73/861.77 |
| 5,218,346 | * 6/1993 | Meixler | 73/861.77 |
| 5,246,045 | 9/1993 | Clothier | 141/95 |
| 5,269,150 | 12/1993 | Whitt | 62/77 |
| 5,303,559 | * 4/1994 | Sevrain et al. | 62/149 X |
| 5,758,506 | 6/1998 | Hancock et al. | 62/77 |

* cited by examiner

Primary Examiner—Harry B. Tanner
(74) Attorney, Agent, or Firm—Joseph N. Breaux

(57) ABSTRACT

A light weight, refrigerant flow meter that calculates the quantity of refrigerant that has flowed through the refrigerant flow meter for a given period of time and provides a continuous visual display output of the quantity of refrigerant transferred between a refrigerant container and a system being charged with refrigerant.

1 Claim, 4 Drawing Sheets

REFRIGERANT FLOW METER

DESCRIPTION

1. Technical Field

The present invention relates to servicing equipment for refrigeration systems and more particularly to a refrigerant flow meter that includes a refrigerant flow meter housing and a microprocessor circuit; the refrigerant flow meter housing having an input fitting; an output fitting in connection with the input fitting through a refrigerant flow passageway; two concentrically aligned sensor windows in photo transferring connection with the refrigerant flow passageway; a visual fluid flow verification window in viewing connection with the refrigerant flow passageway; and a paddle wheel flow transducer assembly including a photomicrosensor assembly installed across the two concentrically aligned sensor windows such that a photo signal is transferred through the two concentrically aligned sensor windows and a paddle wheel rotatably installed within the refrigerant flow passageway between the two concentrically aligned sensor windows and having a number of equally spaced openings formed there through that sequentially pass between the two concentrically aligned sensor windows when the paddle wheel rotates to cause a pulsing volume signal output from the photomicrosensor assembly proportional to the volume of refrigerant flow through the refrigerant flow passageway; the microprocessor circuit including a microcontroller having a random access memory, a read only memory, and a refrigerant volume input in electrical connection with the volume output of the photomicrosensor assembly; a housing temperature sensor mechanically mounted to the refrigerant flow meter housing and having a housing temperature signal output in electrical connection with a housing temperature input of the microcontroller; an ambient temperature sensor mechanically mounted away from to the refrigerant flow meter housing and having an ambient temperature signal output in electrical connection with an ambient temperature input of the microcontroller; a material select switch in electrical connection with a material select input of the microcontroller; a material index switch in electrical connection with a material index input of the microcontroller; a reset switch in electrical connection with a reset input of the microcontroller; and a display assembly including a display driver in electrical connection between a display output of the microcontroller and a display input of a visual display device; the microcontroller having a look up table of information on a number of refrigerant materials programmed therein that is selected by a user using the material and select switches; the microcontroller being programmed to monitor the pulsing volume signal output from the photomicrosensor assembly; calculate a volume quantity based on an accumulated value of the pulsing volume signal and the temperature sensed by the housing and ambient temperature sensors; and display the volume quantity on the display assembly; the microcontroller resetting the accumulated value of the pulsing volume signal to zero when the reset switch is depressed.

2. Background Art

When repairing an air conditioning unit that requires the repair and resealing of the system, the refrigerant must be replaced within the system prior to resealing the system. This is typically accomplished by hooking a container of refrigerant to a fitting on the system and then opening the container until a precise quantity of refrigerant is transferred from the container to the system. Determining the precise quantity of refrigerant transferred to the system can be difficult and is typically accomplished using a scale to weigh the container before and after the transfer has occurred. The scale is large, bulky to carry and subject to variations that can cause significant errors in the quantity of refrigerant transferred. In addition, if the scale is dropped, it often has to be sent for recalibration by a scale technician. It would be a benefit, therefore, to have a small, light weight refrigerant flow meter that would calculate the quantity of refrigerant that has flowed through the refrigerant flow meter for a given period of time and provide a continuous visual display output of the quantity of refrigerant transferred between a refrigerant container and a system being charged with refrigerant.

GENERAL SUMMARY DISCUSSION OF INVENTION

It is thus an object of the invention to provide a refrigerant flow meter that includes a refrigerant flow meter housing and a microprocessor circuit; The refrigerant flow meter housing having an input fitting; an output fitting in connection with the input fitting through a refrigerant flow passageway; two concentrically aligned sensor windows in photo transferring connection with the refrigerant flow passageway; a visual fluid flow verification window in viewing connection with the refrigerant flow passageway; and a paddle wheel flow transducer assembly including a photomicrosensor assembly installed across the two concentrically aligned sensor windows such that a photo signal is transferred through the two concentrically aligned sensor windows and a paddle wheel rotatably installed within the refrigerant flow passageway between the two concentrically aligned sensor windows and having a number of equally spaced openings formed therethrough that sequentially pass between the two concentrically aligned sensor windows when the paddle wheel rotates to cause a pulsing volume signal output from the photomicrosensor assembly proportional to the volume of refrigerant flow through the refrigerant flow passageway; the microprocessor circuit including a microcontroller having a random access memory, a read only memory, and a refrigerant volume input in electrical connection with the volume output of the photomicrosensor assembly; a housing temperature sensor mechanically mounted to the refrigerant flow meter housing and having a housing temperature signal output in electrical connection with a housing temperature input of the microcontroller; an ambient temperature sensor mechanically mounted away from to the refrigerant flow meter housing and having an ambient temperature signal output in electrical connection with an ambient temperature input of the microcontroller; a material select switch in electrical connection with a material select input of the microcontroller; a material index switch in electrical connection with a material index input of the microcontroller; a reset switch in electrical connection with a reset input of the microcontroller; and a display assembly including a display driver in electrical connection between a display output of the microcontroller and a display input of a visual display device; the microcontroller having a look up table of information on a number of refrigerant materials programmed therein that is selected by a user using the material and select switches; the microcontroller being programmed to monitor the pulsing volume signal output from the photomicrosensor assembly; calculate a volume quantity based on an accumulated value of the pulsing volume signal and the temperature sensed by the housing and ambient temperature sensors; and display the volume quantity on the display assembly; the microcontroller resetting the accumulated value of the pulsing volume signal to zero when the reset switch is depressed.

Accordingly, a refrigerant flow meter is provided. The refrigerant flow meter includes a refrigerant flow meter housing and a microprocessor circuit; the refrigerant flow meter housing having an input fitting; an output fitting in connection with the input fitting through a refrigerant flow passageway; two concentrically aligned sensor windows in photo transferring connection with the refrigerant flow passageway; a visual fluid flow verification window in viewing connection with the refrigerant flow passageway; and a paddle wheel flow transducer assembly including a photomicrosensor assembly installed across the two concentrically aligned sensor windows such that a photo signal is transferred through the two concentrically aligned sensor windows and a paddle wheel rotatably installed within the refrigerant flow passageway between the two concentrically aligned sensor windows and having a number of equally spaced openings formed therethrough that sequentially pass between the two concentrically aligned sensor windows when the paddle wheel rotates to cause a pulsing volume signal output from the photomicrosensor assembly proportional to the volume of refrigerant flow through the refrigerant flow passageway; the microprocessor circuit including a microcontroller having a random access memory, a read only memory, and a refrigerant volume input in electrical connection with the volume output of the photomicrosensor assembly; a housing temperature sensor mechanically mounted to the refrigerant flow meter housing and having a housing temperature signal output in electrical connection with a housing temperature input of the microcontroller; an ambient temperature sensor mechanically mounted away from to the refrigerant flow meter housing and having an ambient temperature signal output in electrical connection with an ambient temperature input of the microcontroller; a material select switch in electrical connection with a material select input of the microcontroller; a material index switch in electrical connection with a material index input of the microcontroller; a reset switch in electrical connection with a reset input of the microcontroller; and a display assembly including a display driver in electrical connection between a display output of the microcontroller and a display input of a visual display device; the microcontroller having a look up table of information on a number of refrigerant materials programmed therein that is selected by a user using the material and select switches; the microcontroller being programmed to monitor the pulsing volume signal output from the photomicrosensor assembly; calculate a volume quantity based on an accumulated value of the pulsing volume signal and the temperature sensed by the housing and ambient temperature sensors; and display the volume quantity on the display assembly; the microcontroller resetting the accumulated value of the pulsing volume signal to zero when the reset switch is depressed.

BRIEF DESCRIPTION OF DRAWINGS

For a further understanding of the nature and objects of the present invention, reference should be made to the following detailed description, taken in conjunction with the accompanying drawings, in which like elements are given the same or analogous reference numbers and wherein.

EXEMPLARY MODE FOR CARRYING OUT THE INVENTION

Figure 1:
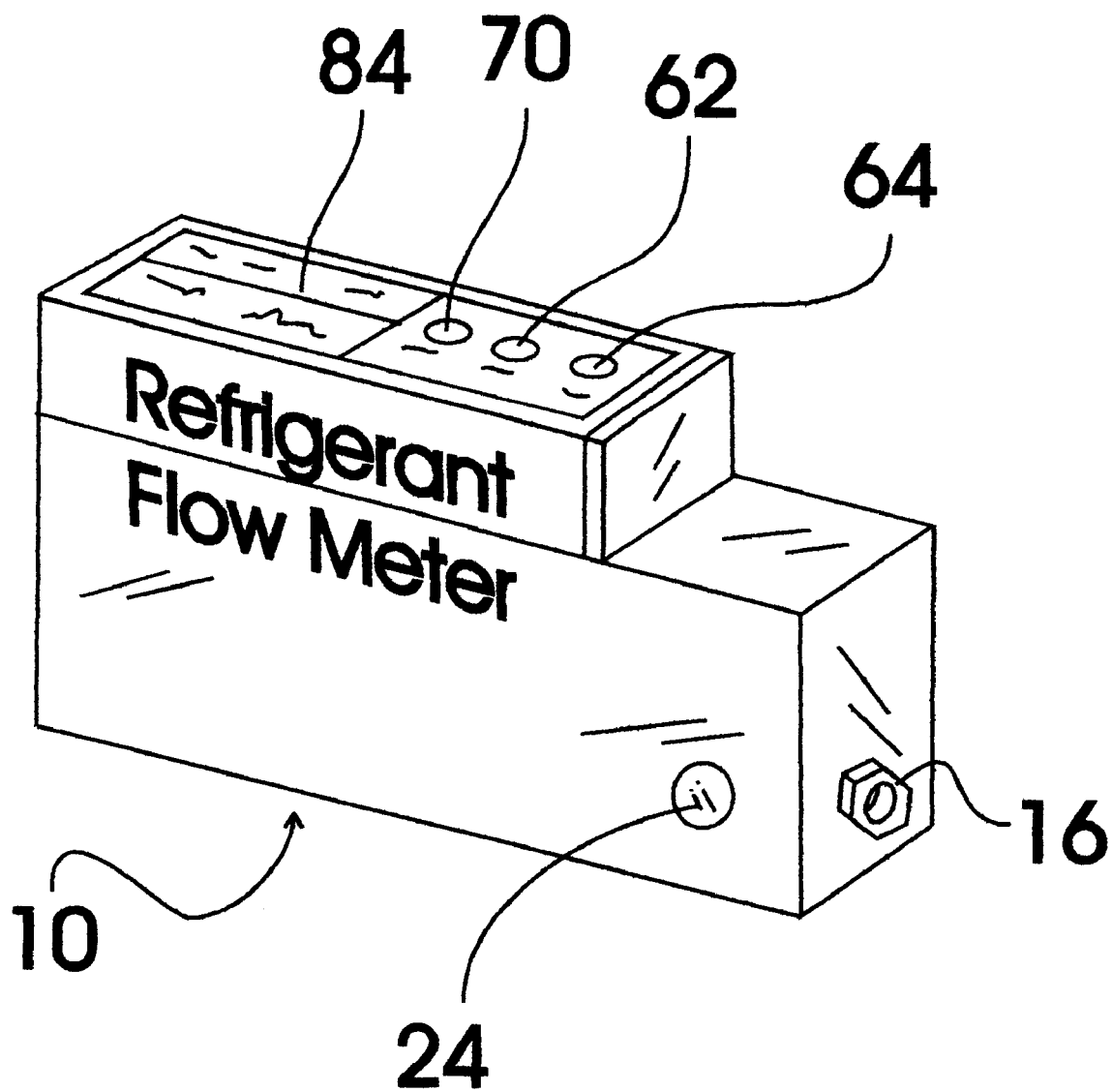
FIG. 1 is a perspective view of an exemplary embodiment of the refrigerant flow meter of the present invention.
Figure 2:
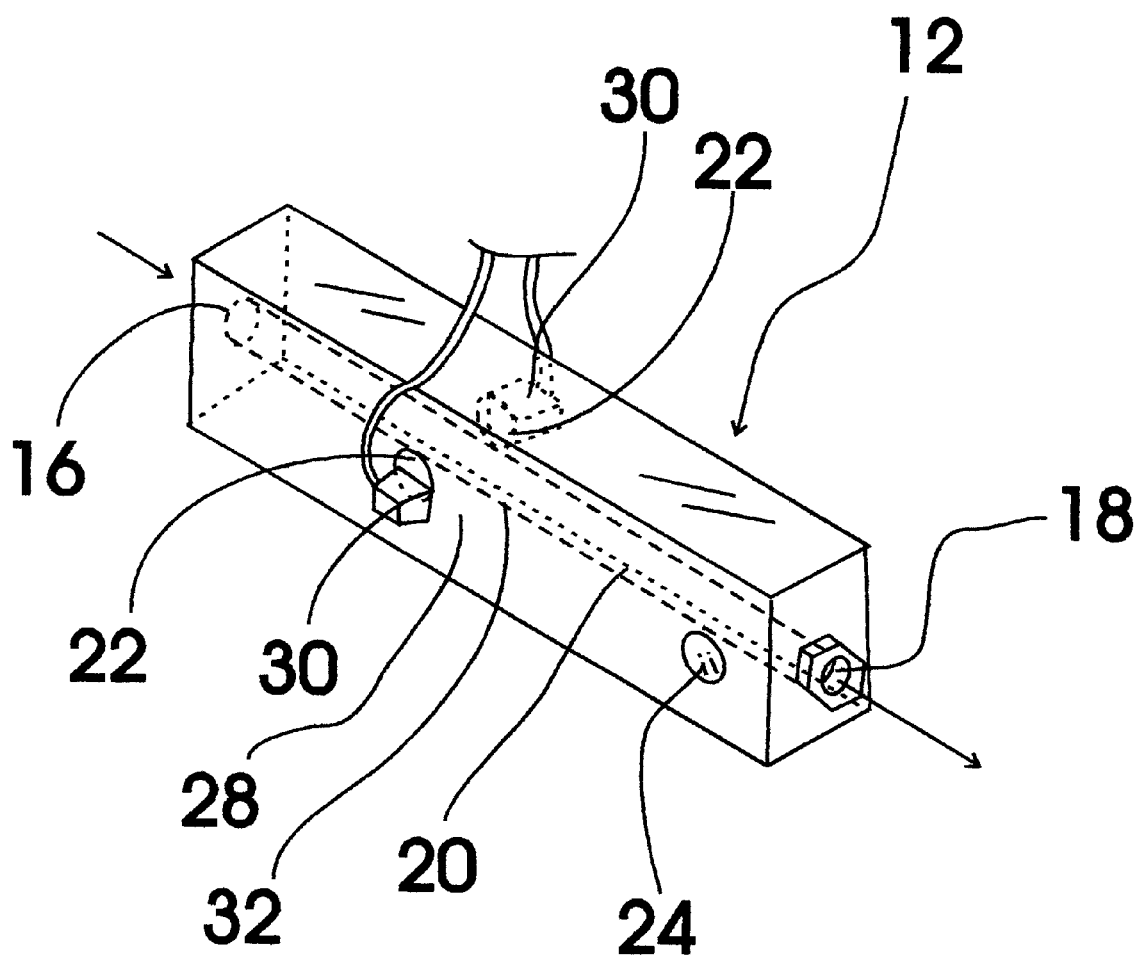
FIG. 2 is a detail perspective view of an exemplary embodiment of the refrigerant flow meter housing in isolation.
Figure 3:
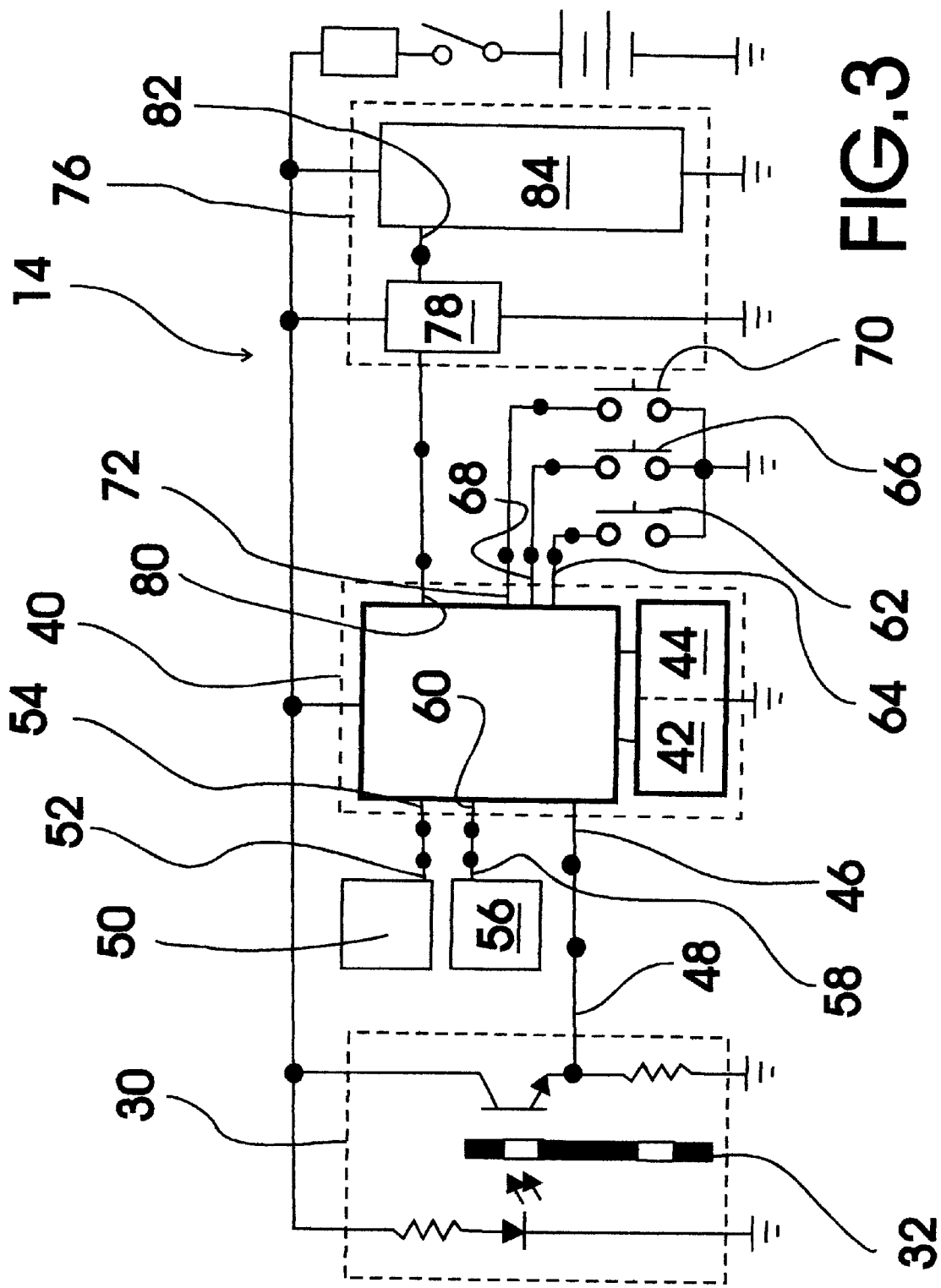
FIG. 3 is a schematic drawing of the microprocessor circuit.
Figure 4:
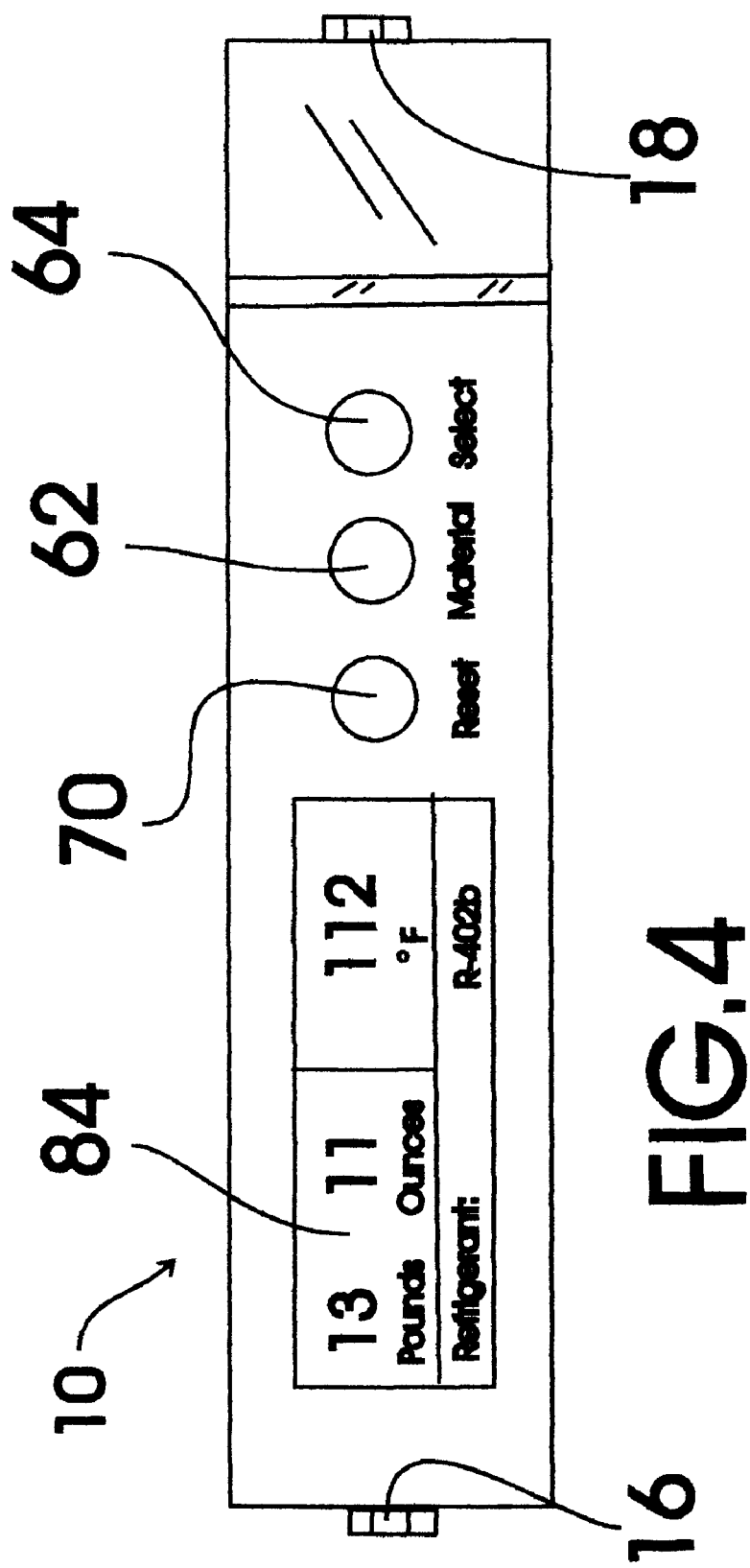
FIG. 4 is a plan view of the top of the refrigerant flow meter of FIG. 1.

FIGS. 1–4 show various aspects of an exemplary embodiment of the refrigerant flow meter of the present invention, generally designated 10. Refrigerant flow meter 10 includes a refrigerant flow meter housing, generally designated 12, and a microprocessor circuit, generally designated 14.

Refrigerant flow meter housing 14 is constructed of machined brass and includes an input fitting 16; an output fitting 18 in connection with the input fitting through a refrigerant flow passageway 20 (shown in dashed lines); two concentrically aligned sensor windows 22 in photo transferring connection with the refrigerant flow passageway 20; a visual fluid flow verification window 24 in viewing connection with the refrigerant flow passageway 20; and a paddle wheel flow transducer assembly 28 (shown in dashed lines) including a photomicrosensor assembly 30 installed across the two concentrically aligned sensor windows 22 such that a photo signal is transferred through the two concentrically aligned sensor windows 22 and a paddle wheel 32 is rotatably installed within the refrigerant flow passageway 20 between the two concentrically aligned sensor windows 22 that has a number of equally spaced openings formed therethrough that sequentially pass between the two concentrically aligned sensor windows 22 when the paddle wheel 32 rotates to cause a pulsing volume signal output from the photomicrosensor assembly 30 that is proportional to the volume of refrigerant flow through the refrigerant flow passageway 20.

Microprocessor circuit 14 includes a microcontroller 40 having a random access memory 42, a read only memory 44, and a refrigerant volume input 46 in electrical connection with the volume output 48 of the photomicrosensor assembly 30. Microprocessor circuit 14 also includes a housing temperature sensor 50 that is mechanically mounted to the refrigerant flow meter housing 12 and has a housing temperature signal output 52 in electrical connection with a housing temperature input 54 of microcontroller 40; an ambient temperature sensor 56 mechanically mounted away from to the refrigerant flow meter housing 12 and having an ambient temperature signal output 58 in electrical connection with an ambient temperature input 60 of the microcontroller 40; a material select switch 62 in electrical connection with a material select input 64 of the microcontroller 40; a material index switch 66 in electrical connection with a material index input 68 of the microcontroller 40; a reset switch 70 in electrical connection with a reset input 72 of the microcontroller 40; and a display assembly 76 including a display driver 78 in electrical connection between a display output 80 of the microcontroller 40 and a display input 82 of a liquid crystal visual display device 84.

Microcontroller 40 has a look up table of information on a number of refrigerant materials programmed therein including refrigerants such as R-12, R-22, R-502, R-134A, R-402A, R-402B, R-404A, R-407C, R-500, and $H_2O$. Prior to use, the user selects the correct refrigerant from the list sequentially pressing the material index switch 64 until the correct refrigerant type is displayed in LCD display 84 and then depressing material select switch 62.

Microcontroller 40 is programmed to monitor the pulsing volume signal output from the photomicrosensor assembly 30; calculate a volume quantity based on an accumulated value of the pulsing volume signal and the temperature sensed by the housing and ambient temperature sensors 50,56; and display the volume quantity on the display assembly 76. Microcontroller 40 resets the accumulated value of the pulsing volume signal to zero when the reset switch 70 is depressed.

It can be seen from the preceding description that a refrigerant flow meter has been provided.

It is noted that the embodiment of the refrigerant flow meter described herein in detail for exemplary purposes is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. A refrigerant flow meter comprising:

a refrigerant flow meter housing having:
   an input fitting;
   an output fitting in connection with the input fitting through a refrigerant flow passageway;
   two concentrically aligned sensor windows in photo transferring connection with the refrigerant flow passageway;
   a visual fluid flow verification window in viewing connection with the refrigerant flow passageway; and
   a paddle wheel flow transducer assembly including a photomicrosensor assembly installed across the two concentrically aligned sensor windows such that a photo signal is transferred through the two concentrically aligned sensor windows and a paddle wheel rotatably installed within the refrigerant flow passageway between the two concentrically aligned sensor windows and having a number of equally spaced openings formed therethrough that sequentially pass between the two concentrically aligned sensor windows when the paddle wheel rotates to cause a pulsing volume signal output from the photomicrosensor assembly proportional to the volume of refrigerant flow through the refrigerant flow passageway; and a microprocessor circuit including:
   a microcontroller having a random access memory, a read only memory, and a refrigerant volume input in electrical connection with the volume output of the photomicrosensor assembly;
   a housing temperature sensor mechanically mounted to the refrigerant flow meter housing and having a housing temperature signal output in electrical connection with a housing temperature input of the microcontroller;
   an ambient temperature sensor mechanically mounted away from to the refrigerant flow meter housing and having an ambient temperature signal output in electrical connection with an ambient temperature input of the microcontroller;
   a material select switch in electrical connection with a material select input of the microcontroller;
   a material index switch in electrical connection with a material index input of the microcontroller;
   a reset switch in electrical connection with a reset input of the microcontroller; and
   a display assembly including a display driver in electrical connection between a display output of the microcontroller and a display input of a visual display device;

the microcontroller having a look up table of information on a number of refrigerant materials programmed therein that is selected by a user using the material and select switches;

the microcontroller being programmed to monitor the pulsing volume signal output from the photomicrosensor assembly; calculate a volume quantity based on an accumulated value of the pulsing volume signal and the temperature sensed by the housing and ambient temperature sensors; and display the volume quantity on the display assembly;

the microcontroller resetting the accumulated value of the pulsing volume signal to zero when the reset switch is depressed.

* * * * *